(12) United States Patent
Marion et al.

(10) Patent No.: US 7,632,483 B2
(45) Date of Patent: Dec. 15, 2009

(54) HYDROGEN GENERATING SYSTEM AND HYDRODEHALOGENATION METHOD

(75) Inventors: Philippe Marion, Vernaison (FR); Cécile Rosier, Soucieu En Jarrest (FR)

(73) Assignee: Rhodia Chimie, Aubervilliers (FR)

( * ) Notice: Subject to any disclaimer, the term of this patent is extended or adjusted under 35 U.S.C. 154(b) by 207 days.

(21) Appl. No.: 10/451,427

(22) PCT Filed: Dec. 21, 2001

(86) PCT No.: PCT/FR01/04171

§ 371 (c)(1),
(2), (4) Date: Nov. 6, 2003

(87) PCT Pub. No.: WO02/49957

PCT Pub. Date: Jun. 27, 2002

(65) Prior Publication Data

US 2004/0068149 A1    Apr. 8, 2004

(30) Foreign Application Priority Data

Dec. 21, 2000  (FR)  .................................. 00 16799

(51) Int. Cl.
    *C01B 3/08*  (2006.01)
(52) U.S. Cl. .................. 423/657; 423/658; 252/183.14; 252/182.32; 252/182.33; 502/84
(58) Field of Classification Search ............ 252/183.14, 252/182.32, 182.33; 502/84; 423/657, 658
See application file for complete search history.

(56) References Cited

U.S. PATENT DOCUMENTS

| | | | |
|---|---|---|---|
| 3,788,972 A | * | 1/1974 | Henry et al. .................. 208/59 |
| 3,932,600 A | | 1/1976 | Gutbier et al. |
| 4,547,356 A | * | 10/1985 | Papineau .................... 423/658 |
| 5,112,473 A | * | 5/1992 | Dai et al. ................ 208/120.15 |
| 5,490,941 A | | 2/1996 | Miyabe et al. |
| 5,531,901 A | | 7/1996 | Miyabe et al. |
| 5,830,426 A | * | 11/1998 | Werth ......................... 423/658 |
| 5,840,270 A | * | 11/1998 | Werth ......................... 423/658 |
| 5,958,829 A | * | 9/1999 | Domesle et al. ............. 502/333 |
| 6,361,757 B1 | * | 3/2002 | Shikada et al. .............. 423/651 |
| 6,582,676 B2 | * | 6/2003 | Chaklader ................. 423/648.1 |
| 6,784,135 B2 | * | 8/2004 | Scholten et al. ............. 502/245 |
| 7,316,718 B2 | * | 1/2008 | Amendola et al. ............. 48/61 |

FOREIGN PATENT DOCUMENTS

| | | |
|---|---|---|
| EP | 0 417 279 | 3/1991 |
| EP | 0 417 279 A1 | 3/1991 |
| EP | 0 563 669 A1 | 10/1993 |
| JP | 49-69559 | 7/1974 |
| JP | 52-75688 | 6/1977 |
| JP | 57-123802 A | 8/1982 |
| JP | 58-55304 A | 4/1983 |
| JP | 64-61301 A | 3/1989 |
| JP | 05-269476 A | 10/1993 |
| JP | 07-267601 A | 10/1995 |
| JP | 11-157802 A | 6/1999 |
| RU | 2 023 652 C1 | 11/1994 |
| RU | 2023652 | 11/1994 |
| WO | WO 99/17875 * | 4/1999 |

OTHER PUBLICATIONS

International Search Report Considered.*
Database WPI, Section Ch, Week 199528, Derwent Publications Ltd., London, GB; XP002170596 & RU 2 023 652 C (Nov. 30, 1994).
Patent Abstracts of Japan, vol. 006, No. 219, (Nov. 2, 1982), JP 57 123802 (Aug. 21, 1982).
Patent Abstracts of Japan, vol. 007, No. 143, (Jun. 22, 1983), JP 58 055304 (Apr. 1, 1983).
Patent Abstracts of Japan, vol. 1999, No. 11, (Sep. 30, 1999), JP 11 157802 (Jun. 15, 1999).

* cited by examiner

*Primary Examiner*—Stanley Silverman
*Assistant Examiner*—Paul Wartalowicz
(74) *Attorney, Agent, or Firm*—Buchanan, Ingersoll & Rooney, P.C.

(57) ABSTRACT

The invention concerns a hydrogen generating system, characterized in that it combines a water-corrodible metal, an inorganic material, said material having a specific surface capable of fixing the oxide and/or hydroxide form(s) of said metals generated during corrosion. The invention also concerns a method for generating hydrogen and its uses, in particular in a hydrodehalogenation process of halogenated organic compounds present in aqueous media to be purified.

19 Claims, No Drawings

HYDROGEN GENERATING SYSTEM AND HYDRODEHALOGENATION METHOD

The present invention relates principally to a hydrogen generating system. It also relates to a method of hydrogen generation and applications thereof, particularly in a method of hydrodehalogenation of halogenated organic compounds present in aqueous media to be purified.

The present invention relates more particularly to the catalytic degradation of pollutants, more particularly of volatile halogenated organic compounds (VHOC) such as perchloroethylene (PCE), vinyl chloride (VC), dichloroethane (DCE), dichloroethylene, chloroform, carbon tetrachloride and trichloroethylene (TCE), . . . .

This type of degradation is usually carried out by the use of a method which generally involves a reduction of these pollutants with the aid of hydrogen, in the presence of a so-called hydrodehalogenation catalyst generally based on palladium fixed on an inorganic carrier. More precisely, the method proceeds with a reducing dehalogenation of the halogenated components in the course of which halogen is extracted from the molecule in the form of a free halogenated ion in aqueous solution and replaced on the molecule by a hydrogen ion. This type of reaction therefore requires a source of electrons.

Two alternatives are available nowadays for carrying out this type of reaction.

According to a first variant, a zero valence metal is used, preferably iron, as the source of electrons and source of metal for the dehalogenation. This approach has the advantage that it is relatively inexpensive but on the other hand it has the drawbacks that it is not very quick and it does not suit all the VHOC and particularly vinyl chloride.

The second alternative for its part involves the use of a catalytic system which is more elaborate and therefore more costly, which moreover at the same time requires the use of a continuous source of hydrogen. This hydrogen is generally introduced in the form of gaseous hydrogen or generated in situ with the aid of a complex such as hydrazine or borohydrides.

The object of the present invention more precisely is to propose a third alternative to the two alternatives referred to previously, this third alternative being based more particularly on the use of an original hydrogen generating system.

Unexpectedly, the inventors have demonstrated that it is possible to provide satisfaction simultaneously in terms of cost and of kinetics with the aid of a hydrogen generating system which involves in particular the use of a zero valence metal such as iron as the source of electrons.

More precisely, the present invention relates primarily to a hydrogen generating system, characterised in that it combines a water-corrodible metal with an inorganic material, the said material having a specific surface area which favours the fixing of the oxide and/or hydroxide form(s) of the said metal generated during corrosion thereof.

Advantageously, the combination of an inorganic material with the metal considered as a source of electrons in fact permits a significant increase in the quantity of hydrogen generated by comparison with a conventional method, that is to say one using only the zero valence metal.

In so far as the zero valence metal is concerned, it has an oxidation reduction potential which is sufficiently negative to be able to reduce the water.

As representative examples of metals suitable for the invention, mention may be made in particular of steel, iron, zinc, aluminium, tin, bismuth, cobalt and nickel.

Zero valence iron is preferred, this being of particular interest bearing in mind its low cost.

With regard to the inorganic material, this is preferably chosen from amongst the metal oxides, mixed or unmixed, in so far as they are of course inert in the reaction conditions.

As representative examples of these oxides, mention may be made in particular of aluminas, silicas, the oxides of zirconium, cerium, titanium and iron, and zeolites.

The inorganic materials may be used in different forms: powder, shaped products such as granulates (for example cylinders or beads), pellets, monoliths (blocks in honeycomb shape) which are obtained by extrusion, moulding, compaction or any other type of known method. In practice, on the industrial scale these are in the form of granulates, beads or monoliths which have the most advantages not only in terms of effectiveness but also in terms of the convenience of using them.

The inorganic material preferably has a specific surface area greater than that of the zero valence metal.

The inorganic materials generally have a specific surface area greater by at least a factor of 100, and preferably of $10^4$, than that of the metal, and this factor can rise to a value of $10^6$.

According to a preferred embodiment of the invention, this is a synthetic or natural zeolite.

Zeolite is understood to mean a crystallised tectosilicate of natural or synthetic origin of which the crystals result from the three-dimensional assembly of tetrahedral units of $SiO_4$ and $TO_4$, T representing a trivalent element such as aluminium, gallium, boron and iron, preferably aluminium. Zeolites of the aluminosilicate type are the most common.

Amongst the zeolites it is possible to use natural zeolites such as for example offretite, clinoptilotite, erionite, chabazite and philipsite.

Synthetic zeolites are also suitable.

As examples of synthetic zeolites with a one-dimensional lattice, mention may be made inter alia of zeolite ZSM-4, zeolite ZSM-12, zeolite ZSM-22, zeolite ZSM-23 and zeolite ZSM-48.

As examples of zeolites with a two-dimensional lattice which are preferably used, mention may be made of zeolite beta, mordenite and ferrierite.

Use is preferably made of synthetic zeolites and more particularly those which are in the following forms:
  mazzite with a molar ratio Si/Al of 3.4,
  zeolite L with a molar ratio Si/Al of 1.5 to 3.5,
  mordenite with a molar ratio Si/Al of 5 to 15,
  ferrierite with a molar ratio Si/Al of 3 to 10,
  offretite with a molar ration Si/Al of 4 to 8.5,
  zeolites beta with a molar ratio Si/Al of 15 to 25,
  zeolites Y, in particular the zeolites obtained after dealumination treatment (for example hydrotreatment, washing with the aid of hydrochloric acid or treatment with $SiCl_4$), more particularly zeolites US-Y with a molar ratio Si/Al greater than 3, preferably between 6 and 60,
  zeolite X of the faujasite type with a molar ratio Si/Al of 0.7 to 1.5,
  zeolites ZSM-5 or aluminium silicate with a molar ratio Si/Al of 10 to 2000, and
  zeolite ZSM-11 with a molar ratio of 5 to 30.

The inorganic material is preferably a zeolite having a specific surface area greater than 10 $m^2/g$.

The two zeolites described in the following examples have proved to be of particular interest within the scope of the present invention.

In fact, without wishing to be tied to a specific mechanistic explanation, it appears that the inorganic material acts as a specific carrier with regard to metal oxides and/or hydroxides generated during the oxidation of the zero valence metal.

In fact, these hydroxides are generated automatically during the reaction of water on the metal according to the following scheme:

i. $M^0 \rightarrow M^{n+} + ne^-$ ii. $2H_2O + 2e^- \rightarrow H_2 + 2OH^-$ iii. $M + n(H_2O) \rightarrow M(OH)_n + \frac{n}{2}H_2$ Thus by becoming fixed preferably on the inorganic material and not on the surface of the metal in the zero valence state, the generated metal hydroxides significantly limit the deactivation of the latter.

Thus it is that in the particular case where the generation of hydrogen is carried out by combining 3 g of iron with 15 g of water, and in the presence of a carrier such as a zeolite, the production of hydrogen generated over a period of 24 hours proves to be 250 times greater than that generated under the same operating conditions but in the absence of the said carrier.

According to an advantageous embodiment of the invention, the zero valence metal and the inorganic material are combined in a proportion of 0.5 to 40%, preferably 1 to 20%, by weight of the said material relative to the weight of the metal.

This adjustment between the two compounds is also of course a function of the specific surface area of the inorganic material. It will be understood that the necessary quantity of inorganic material is inversely proportional to its specific surface area.

According to a preferred variant, the zero valence metal is not carried by the inorganic material which is combined with it. It is equally possible to envisage that the inorganic material might also serve as a carrier for another metal capable of intervening by way of catalyst for a reaction following or accompanying the hydrogen generation.

The hydrogen generating system claimed is of particular interest in the field of treatment of effluents for example for the reduction of the VHOC and/or nitrates, in the field of reduction of nitrated compounds, particularly aromatic ones. In fact it is generally possible to envisage exploitation of this system for any application necessitating a continuous supply of hydrogen.

The present invention also relates to a method of hydrogen generation by reduction of water with the aid of a suitable metal, characterised in that the said reduction is carried out within an aqueous medium in the presence of a sufficient quantity of an inorganic material of which the specific surface area favours the deposition of the metal oxide and/or hydroxide form(s) generated in the course of the said reduction.

Naturally, the inorganic material and the metal conform to the definitions presented above within the scope of the claimed system.

In the claimed method, the inorganic material and the metal can be directly introduced into the aqueous medium to be treated, and the aggregate is then agitated in such a way as to optimise the conditions of hydrogen generation.

Another variant of the method may consist of causing the aqueous medium to be treated to circulate through a fixed bed comprising at least the said metal and the inorganic material.

The present invention also relates to the use in a method of hydrogen generation by reduction of water with the aid of a suitable metal, of an inorganic material for the purpose of fixing the oxide and/or hydroxide form(s) of the said metal generated during the reduction.

The present invention also relates to the application of a system for hydrogen generation such as is defined above for the hydrodehalogenation of volatile halogenated organic compounds within an aqueous medium.

More precisely, it proposes a method of hydrodehalogenation of volatile halogenated organic compounds present in an aqueous medium, characterised in that it uses hydrogen generation by a hydrogen generating system according to the invention and catalytic hydrodehalogenation of the volatile halogenated organic compounds with the aid of the hydrogen thus formed and a suitable carried catalyst.

Unexpectedly, the inventors in fact noted that the beneficial effect of the presence of an inorganic material for the generation of hydrogen could also be exploited effectively for the hydrodehalogenation. The fact that the hydrodehalogenation catalyst is placed in an environment highly enriched with hydrogen permits the kinetics of hydrodehalogenation to be increased considerably. This advantageous aspect of the claimed method is demonstrated in particular by the examples presented below.

The inorganic material present in the system is advantageously used in a quantity such that its developed (that is to say, total) surface is greater, preferably by at least a factor of 5, than the developed surface of the inorganic material constituting the carrier for the hydrodehalogenation catalyst. Such a developed surface advantageously permits the catalytic yields of the metal forming the hydrodehalogenation catalyst to be preserved over time.

With regard to the dehydrodehalogenation catalyst, it generally comprises as the metal a metal chosen from amongst palladium, nickel, ruthenium, platinum and/or rhodium. It is preferably palladium.

This metal is likewise carried on an inorganic material. This inorganic material may be chosen from amongst those defined previously. It is preferably an alumina or a zeolite.

Palladium fixed on alumina may be mentioned as the hydrodehalogenation catalyst more particularly preferred within the scope of the invention.

It may be envisaged that the carrier which has the hydrodehalogenation catalyst fixed on its surface simultaneously ensures the functioning of the inorganic material involved in the hydrogen generation reaction. According to this variant, it proves possible to reduce significantly the quantity of metal which forms the carried catalyst. The metal which forms the carried catalyst can then be advantageously used in a proportion of 10 to 150 mmole/kmole of the zero valence metal.

Thus in the particular case where the zero valence metal is iron and the carried catalyst is palladium/alumina, the hydrodehalogenation method can be advantageously carried out with a mass ratio palladium/iron of less than 100 mg of palladium/kg of iron in comparison with 500-5000 mg Pd/kg Fe for conventional methods.

The claimed method may be applied to the reduction of all the organic compounds represented by the families of chlorinated solvents such as trichloroethylene, the chlorinated aromatics such as chlorobenzene, the chlorophenols or also products for the protection of plants such as Lindane™, Dinoterbone™ and nitro compounds.

Thus the claimed dehalogenation method may be applied to the purification of ground waters within a range of temperatures which may vary from 4 to 35° C. It may in particular be carried out within a reactor.

According to a preferred variant of the invention, the hydrogen generating system and the hydrodehalogenation catalyst are separated within the reactor. The zero valence metal and the inorganic material are placed in the lower part of the reactor, at the level of which the liquid medium to be treated is introduced. The hydrogen generated in this lower part then travels towards the upper part of the reactor where the hydrodehalogenation catalyst is placed.

According to this arrangement, the metal oxides and/or hydroxides formed during the hydrogen generation are preferably deposited on the inorganic material present in the lower level of the reactor and not on the carried hydrodehalogenation catalyst. In this way, the activity of the hydrodehalogenation catalyst is optimised and its performances are maintained.

The examples which appear below are presented by way of example and do not limit the scope of the invention.

The carriers tested in the following examples are two zeolites US-Y (4% of $Na_2O_3$ with Si/Al of 2.5) (sold by Engelhard) known as zeolite A and a zeolite HY-CBV 400 (2.5% $Na_2O_3$ and Si/Al of 1.5 and a specific surface area of 50 $m^2$/g) (sold by Zéolyst International) known as zeolite B.

EXAMPLE 1

15 g of water, 3 g of iron and 300 mg of a zeolite A or B are mixed. After agitation over a period of 24 hours it is noted that, in each of the tests, the quantity of hydrogen generated is 250 times greater than the quantity of hydrogen generated in a control test, that is to say in the absence of zeolite.

It is in fact 16.5 ml/kg water/hour as against 0.067 ml/kg water/hour for the control test.

EXAMPLE 2

1.5 mg of trichloroethylene is introduced in the form of a solution at approximately 100 ppm into 15 g of water. Also introduced into this solution are 3 g of iron and 30 mg of a $Pd/Al_2O_3$ catalyst. After agitation for 18 hours and 30 minutes, a transformation rate of 30% of the trichloroethylene is achieved as against a transformation rate of only less than 5% for this same system in the absence of the said catalyst.

In a variant of this test, the reaction is carried out in the presence of 300 mg of alumina (alumina CBL sold by Procatalyse).

Under these conditions, a transformation rate of 100% is achieved in 18 hours and 30 minutes. The only reaction product observed is ethane.

The invention claimed is:

1. Hydrogen generating system comprising a water-corrodible metal, an aqueous medium, and an inorganic material having a specific surface area, and on which is fixed the oxide and/or hydroxide form(s) of the metal generated during corrosion thereof, wherein the inorganic material has a specific surface area greater by at least a factor of 100 than that of the metal, and wherein the water-corrodible metal is present in the aqueous medium and is not carried by the inorganic material, wherein the inorganic material is a synthetic or natural zeolite.

2. System as claimed in claim 1, wherein the metal has a negative oxidation reduction potential.

3. System as claimed in claim 1, wherein the metal is selected from the group consisting of steel, iron, zinc, aluminum, tin, bismuth, cobalt and nickel.

4. System as claimed in claim 1, wherein said metal is iron.

5. System as claimed in claim 1, wherein the inorganic material is a zeolite having a specific surface area greater than 10 $m^2$/g.

6. System as claimed in claim 1, wherein the metal and the inorganic material are combined in a proportion of 0.5 to 40% by weight of the material relative to the weight of the metal.

7. Method of generating hydrogen, comprising producing a continuous supply of hydrogen from the hydrogen generating system as defined in claim 1.

8. Method of conducting a hydrodehalogenation reaction, comprising conducting a hydrodehalogenation reaction with the hydrogen generating system as defined in claim 1, wherein volatile halogenated organic compounds are present in the aqueous medium.

9. Method of hydrodehalogenation of volatile halogenated organic compounds present in an aqueous medium, comprising conducting hydrogen generation with the hydrogen generating system as claimed in claim 1 and catalytic hydrodehalogenation of the volatile halogenated organic compounds in the presence of the hydrogen thus formed and a catalyst.

10. Method as claimed in claim 9, wherein the catalyst comprises a metal selected from the group consisting of palladium, nickel, ruthenium, platinum and rhodium.

11. Method as claimed in claim 10, wherein the metal is fixed on a second inorganic material.

12. Method as claimed in claim 11, wherein the inorganic material present in the hydrogen generating system is used in a quantity such that its developed surface is greater than the developed surface of the second inorganic material.

13. Method as claimed in claim 9, wherein the catalyst is palladium carried on alumina and the metal of the hydrogen generating system is iron.

14. Method as claimed in claim 13, wherein the mass ratio palladium/iron is less than 100 mg of palladium/kg of iron.

15. Method as claimed in claim 9, wherein the aqueous medium is treated within a reactor in which the hydrogen generating system is separated from the catalyst.

16. A hydrogen generating system comprising an aqueous medium containing a water-corrodible metal and an inorganic material, said inorganic material having a surface area which fixes thereon the oxide and/or hydroxide form(s) of the metal generated during corrosion thereof, wherein the inorganic material has a specific surface area greater by at least a factor of 100 than that of the metal, and wherein the water-corrodible metal is present in the aqueous medium and is not carried by the inorganic material, wherein the inorganic material is a synthetic or natural zeolite.

17. A hydrogen generating system according to claim 1, wherein the oxide and/or hydroxide form(s) of the metal generated during corrosion is fixed directly on the inorganic material.

18. A hydrogen generating system according to claim 16, wherein the oxide and/or hydroxide form(s) of the metal generated during corrosion is fixed directly on the inorganic material.

19. A hydrogen generating system according to claim 16, wherein the inorganic material is a zeolite having a specific surface area greater than 10 m2/g.

* * * * *